US012100544B2

(12) United States Patent
Yang et al.

(10) Patent No.: US 12,100,544 B2
(45) Date of Patent: Sep. 24, 2024

(54) DEVICE AND METHOD FOR IMPROVING COERCIVITY OF RING-SHAPED NdFeB MAGNET

(71) Applicant: Yantai Shougang Magnetic Materials Inc, Shandong (CN)

(72) Inventors: Kunkun Yang, Shandong (CN); Chuanshen Wang, Shandong (CN); Zhongjie Peng, Shandong (CN); Kaihong Ding, Shandong (CN)

(73) Assignee: Yantai Shougang Magnetic Materials Inc, Shandong (CN)

(*) Notice: Subject to any disclaimer, the term of this patent is extended or adjusted under 35 U.S.C. 154(b) by 537 days.

(21) Appl. No.: 17/209,273

(22) Filed: Mar. 23, 2021

(65) Prior Publication Data

US 2021/0304960 A1 Sep. 30, 2021

(30) Foreign Application Priority Data

Mar. 24, 2020 (CN) ......................... 202010214860.0

(51) Int. Cl.
*H01F 41/02* (2006.01)
*H01F 1/057* (2006.01)

(52) U.S. Cl.
CPC ......... *H01F 41/0293* (2013.01); *H01F 1/057* (2013.01)

(58) Field of Classification Search
CPC . H01F 41/0293; H01F 1/057; B05B 13/0214; B05B 13/0235; B05B 13/0627; B05B 13/0636; B05B 13/0663; B05B 7/2494; B05B 16/20
See application file for complete search history.

(56) References Cited

U.S. PATENT DOCUMENTS

2015/0086710 A1* 3/2015 Takagi .................. H01F 1/0536 427/132

FOREIGN PATENT DOCUMENTS

CN 208679571 * 4/2019
JP 2013-042152 * 2/2013

* cited by examiner

*Primary Examiner* — Katherine A Bareford
(74) *Attorney, Agent, or Firm* — Samson G. Yu

(57) ABSTRACT

Some embodiments of the invention belongs to a technical field of NdFeB magnet processing, and mainly relates to a device and method for improving the coercivity of ring-shaped NdFeB magnet. A layer of heavy rare earth coating is sprayed on the inner and outer surfaces of the ring-shaped NdFeB magnet by the device, and then the ring-shaped NdFeB magnet sprayed with the heavy rare-earth coating is subjected to diffusion treatment to improve the coercivity of the ring-shaped NdFeB magnet. The invention uses heavy rare earth slurry as the diffusion source, combined with spraying technology, can quickly and uniformly cover a layer of heavy rare earth coating on the inner and outer surfaces of the ring-shaped NdFeB magnet, and the coercivity of the ring-shaped NdFeB magnet is improved after heat treatment.

7 Claims, 1 Drawing Sheet

DEVICE AND METHOD FOR IMPROVING COERCIVITY OF RING-SHAPED NdFeB MAGNET

TECHNICAL FIELD

The present invention relates to a technical field of a process of NdFeB magnet, and more specifically is about a device and method of improving coercivity of the ring-shaped NdFeB magnet.

BACKGROUND

Since an appearing of NdFeB magnets in 1983, it has been widely used in fields of computers, automobiles, medical treatment and wind power generation. A ring-shaped NdFeB magnet has a higher application in a motor field due to its special shape and orientation direction and can achieve better motor performance. A motor will generate heat in a process of high-speed rotation, resulting in a continuous weakening of a magnetism of NdFeB magnets, affecting the performance of the motor. Therefore, in order to avoid a weakening of the magnetism of NdFeB magnets, it is necessary to improve a coercivity of NdFeB magnets applied to the motor.

Adding Dy, Tb or its alloy at a boundary of a Nd2Fe14B phase can increase a crystalline magnetic anisotropy of the Nd2Fe14B phase, which can effectively improve the coercivity of the NdFeB magnets. Based on this theory, a grain boundary diffusion technology is developed. Because of an excellent performance improvement advantages and high economic value of the grain boundary diffusion technology, it has been widely used in a production and processing of NdFeB magnets, and it evolved different ways of diffusion. However, due to a special shape of the ring-shaped NdFeB magnet, the current diffusion methods are unable to effectively and well realize the low-cost and efficient heavy rare earth diffusion to the ring-shaped NdFeB magnet to improve its coercivity.

The document CN106782980A of Baotou Tianhe Magnetic Materials Technology Co. Ltd discloses a method of using heavy rare earth salt solution as electroplating solution, a layer of heavy rare earth coating is electroplated on a surface of NdFeB magnet, and then magnetic properties are improved by high temperature diffusion. This method is suitable for NdFeB magnet with any one shape of square, tile type, steamed buns type, radiation ring and so on. The method has higher versatility. However, this method also has some defects. On the one hand, the electroplating solution of heavy rare earth is easy to oxidize, On the other hand, an existence of a nip and edge effect during a plating process also affects an uniformity of the heavy rare earth film.

SUMMARY

In order to solve a problem that a ring-shaped NdFeB magnet is not easy to be diffused, some embodiments of the present invention provide a device and method for improving coercivity of the ring-shaped NdFeB magnets for homogenization, stabilization, batch production of the ring-shaped NdFeB magnets.

Some embodiments of the present invention adopts the following technical solution:

Some embodiments of the present invention provides a device for improving the coercivity of the ring-shaped NdFeB magnet, it includes a sealed chamber, and wherein the device includes: a plurality of plural fixed support frames disposed in the sealed chamber, a roller with a retractable member, wherein each of the plurality of fixed support frame is equipped with the roller, the retractable member is located on a side wall of the roller and switches between a contracted state and a supporting state; a first spray gun provided at an end of the roller; a sliding rail, wherein each fixed support frame is also provided with the sliding rail, the sliding rail is provided with a support groove, the support groove is configured to reciprocate along the sliding rail; and a second spray gun and a hot air drying spray gun disposed on one side of the roller.

In some embodiments, the device also includes a pressure mixing barrel, the first spray gun and the second spray gun are air pressure atomizing spray gun, the heavy rare earth slurry in the pressure mixing barrel is atomized and sprayed by spray gun and spray gun; a spraying direction of the first spray gun is perpendicular to a spray gun direction and is sprayed around at the same time; the spraying direction of the second spray gun is parallel to the spray gun direction, the first spray gun and the second spray gun are connected with the pressure mixing barrel, the second spray gun and hot air drying spray gun are located directly above the roller and is configured to move back and forth in the plane parallel to the roller.

In some embodiments, the device includes a fixed base disposed in the sealed chamber, bottoms of the plurality of fixed support frames are respectively installed on the fixed base, and the plurality of fixed support frames are arranged in parallel with each other and the distance between two fixed support frames is adjustable.

In some embodiments, the device comprises: a motor, the roller rotates under a control of the motor, and the slide rail is configured to reciprocate up and down along the fixed support frame under a control of the motor, each roller is vertically fixed on a side wall of a corresponding fixed support frame, and the different rollers are arranged in parallel with each other.

In some embodiments, the support groove is disposed in a V-shaped or corrugated shape or with a protrusion on a surface of the support groove, and the supporting groove is located directly below the roller.

Some embodiments of the present invention provide a method for improving the coercivity of the ring-shaped NdFeB magnet, wherein the method includes the following steps:

a. preparation of heavy rare earth slurry: use heavy rare earth powder R, organic binder, and organic solvent to mix and prepare heavy rare earth slurry material;
b. installation of the ring-shaped NdFeB magnets: the plurality of ring-shaped NdFeB magnets to be sprayed are installed on the rotating mechanism that is able to control a simultaneous rotation of the plurality of ring-shaped NdFeB magnets; the plurality of ring-shaped NdFeB magnets are on a same plane, and every two of the plurality of NdFeB magnets are parallel to each other and have space;
c. production of heavy rare earth coating on an outer surface of ring-shaped NdFeB magnet:

the spray gun for spraying the outer surface of the ring-shaped NdFeB magnet is disposed on a side of a plane where the plurality of ring-shaped NdFeB magnets are located, when the plurality of ring-shaped NdFeB magnets rotate around itself, the spray gun sprays the outer surface of the ring-shaped NdFeB magnet, after spraying, the ring-shaped NdFeB magnet is dried with hot air, so that the heavy rare earth slurry sprayed on the outer surface of the ring-shaped NdFeB magnet solidifies to form a layer of heavy rare earth coating;

d. production of heavy rare earth coating on the inner surface of ring-shaped NdFeB magnet:

the spray gun for spraying an inner surface of the ring-shaped NdFeB magnet is disposed in an axial direction of the ring-shaped NdFeB magnet, the plurality of ring-shaped NdFeB magnets are controlled to separate from the rotating mechanism, and then the plurality of ring-shaped NdFeB magnets are controlled to move horizontally along the spray gun direction for spraying the inner surface of the ring-shaped NdFeB magnet, when the plurality of ring-shaped NdFeB magnets pass through the spray gun in turn, turn on the spray gun to spray heavy rare earth slurry on the inner surface of the ring-shaped NdFeB magnet, remove the ring-shaped NdFeB magnet after spraying, and place the ring-shaped NdFeB magnet in an oven for drying, making the heavy rare earth slurry on the inner surface of the ring-shaped NdFeB magnet is solidified to form a heavy rare earth coating;

e. diffusion and aging treatment: the ring-shaped NdFeB magnets with heavy rare earth coatings sprayed on both the inner and outer surfaces are subjected to diffusion and aging treatment under the protection of vacuum or inert gas to increase coercivity of the ring-shaped NdFeB magnets.

In some embodiments, in step a, the component of the heavy rare earth powder R includes pure Dy powder, pure Tb powder, Dy alloy powder, Tb alloy powder, Dy compound powder and Tb compound powder; an organic binder is a resin type adhesive or a rubber type adhesive, an organic solvent is a ketone, a benzene or a ester solvent.

In some embodiments, the rotating mechanism in step b includes a roller and a retractable member located on a side wall of the roller, the plurality of ring-shaped NdFeB magnets are sleeved on the retractable member, and then the retractable member is adjusted to be in a supporting state so that the plurality of ring-shaped NdFeB magnets are supported on the retractable member.

In some embodiments, the spray gun that sprays the outer surface of the ring-shaped NdFeB magnet is called the second spray gun, and there is a distance between the second spray gun and the outer surface of the ring-shaped NdFeB magnet to be sprayed.

In some embodiments, in step d, adjust the retractable member to be in a contracted state, so that the plurality of ring-shaped NdFeB magnets is separated from a support of the retractable member.

In some embodiments, the spray gun for spraying the inner surface of the plurality of ring-shaped NdFeB magnets in step d is called the first spray gun, the support mechanism controls a movement of the plurality of ring-shaped NdFeB magnets to a position where the first spray gun located, the support mechanism includes a support frame, a sliding rail that moves up and down along the support frame, the support groove for supporting the plurality of ring-shaped NdFeB magnets, when the plurality of ring-shaped NdFeB magnets is separated from the roller, the supporting groove drives the plurality of ring-shaped NdFeB magnets to move along the sliding rail to the first spray gun; a thickness of the heavy rare earth coating on the inner surface of the ring-shaped NdFeB magnet is greater than or equal to a thickness of the heavy rare earth layer on the outer surface.

In some embodiments, a temperature of a diffusion treatment in step f is 850° C.-950° C., and a diffusion time is 4-72 h, the aging temperature of a aging treatment is 450-650° C., and a aging time is 3-15 h.

Compared with the prior art, the present invention has the following advantages:

Using the device and the method disclosed in the present invention, a layer of heavy rare earth slurry can be quickly coated on the inner and outer surfaces of the ring-shaped NdFeB magnet, and after diffusion, the coercivity of the ring-shaped NdFeB magnet can be greatly improved. In addition, compared with the existing methods of electrophoresis, electroplating, etc., which can realize the diffusion of ring-shaped NdFeB magnets, heavy rare earth coating obtained on the outer surface and inner surface of the ring-shaped NdFeB magnet using the present invention is more uniform, and the thickness of film layer is more controllable, and the coercivity of the ring-shaped NdFeB magnet after diffusion is more uniform.

Herein, the drawings include the following drawing markers:

1. pressure mixing barrel, 2. sealing chamber, 3. fixing base, 4. fixing support frame, 5. roller, 6. slide rail, 7. retractable member,

7-1. retractable member in supporting state, 7-2. retractable member in contracted state, 8. the first spray gun, 9. support groove, 10. the second spray gun, 11. ring-shaped NdFeB magnet, 12. hot air drying spray gun.

DETAILED DESCRIPTION OF THE EMBODIMENTS

The principles and features of the present invention will be described below with reference to the accompanying figures. The explanation of the present invention in the specific embodiments is not intended to limit the scope of the present invention.

Figure 1:
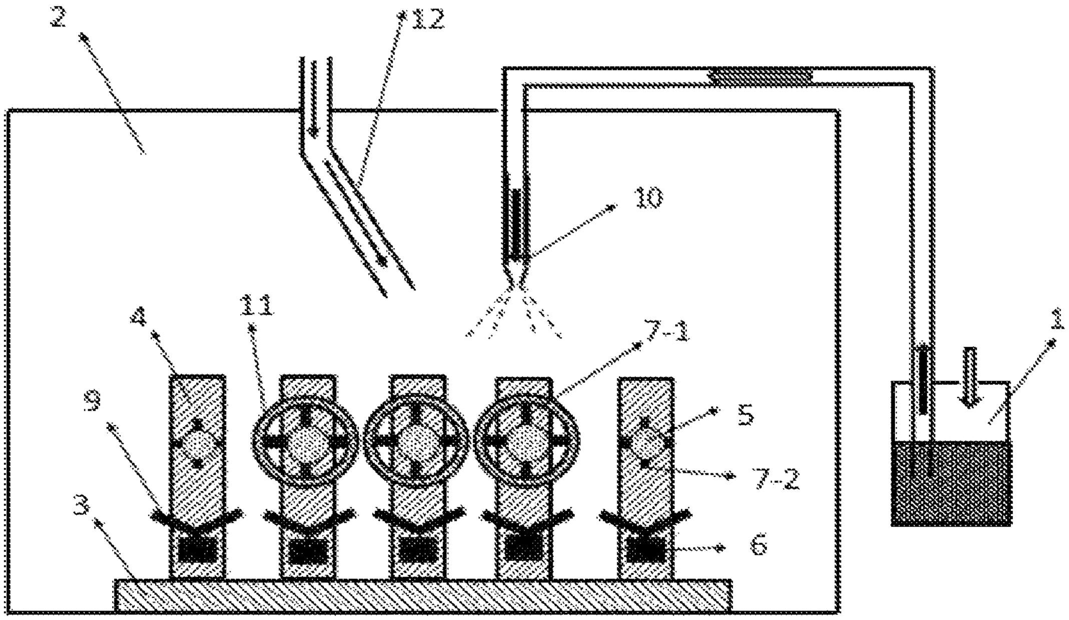
FIG. 1 illustrates a side view of the device of improving coercivity of ring-shaped NdFeB magnet of the present invention.

As shown in FIG. 1, the device used in the present invention, it is installed in the sealed chamber 2. The spraying of the ring-shaped NdFeB magnet is completed in the sealed chamber 2. a rotating mechanism and a supporting mechanism is provided in the sealed chamber 2. The rotating mechanism includes the roller 5, the retractable member 7; the support mechanism includes the fixed base 3, the support frame 4, the slide rail 6, and the support groove 9; the device is also provided with a spraying mechanism, which includes a first spray gun 8, a second spray gun 10, and a hot air drying spray gun 12.

Figure 2:
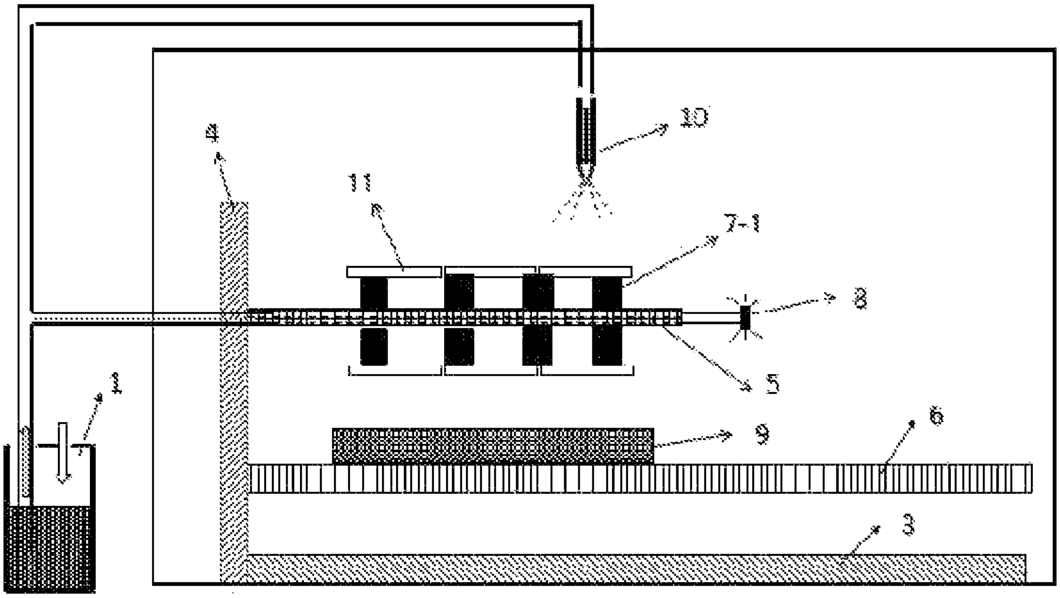
FIG. 2 illustrates a front view of the device of improving coercivity of ring-shaped NdFeB magnet of the present invention.

As shown in FIG. 2, one end of the first spray gun 8 and one end of the second spray gun 10 are communicated with the pressure mixing barrel 1 through the pipeline. Heavy rare earth slurry is in the pressure mixing barrel 1, and the first spray gun 8 and the second spray gun 10 are both pneumatic atomization spray guns.

A fixed base 3 is provided at a bottom of the sealed chamber 2, the support frame 4 is provided above the fixed base 3, and the roller 5 is disposed at the upper position of the support frame 4, and the roller 5 is parallel to the bottom end of the sealed compartment 2, and Roller 5 can rotate.

The retractable member 7 is installed on the outer surface of the roller 5, and the plurality of ring-shaped NdFeB magnets are sleeved on the telescopic part 7. The retractable member 7 is a plurality of telescopic rods disposed on the roller 5. The roller 5 and the retractable member 7 are all controlled by the motor. The motor controls the rotation of the roller 5, and the motor controls the contraction and support of the retractable member 7. The retractable member 7 switches between the contracted and supporting states. When the retractable member 7 is in the supporting state, the ring-shaped NdFeB magnet can rotate synchronously with the roller 5, and when the retractable member 7 is in the contracted state, the ring-shaped NdFeB magnet no longer rotates with the roller 5, and the ring-shaped NdFeB magnet is break away from a control of the roller.

In this embodiment, only one roller 5 is installed, and three ring-shaped NdFeB magnets are placed on each roller 5. According to the spraying needs, a plurality of parallel rollers can be disposed, and the plurality of rollers are placed on each roller. The ring-shaped NdFeB magnets on the same roller are coaxial. When there are the plurality of rollers, the number of rollers is not less than 2, and a center distance between the rollers can be adjusted.

The second spray gun 10 and the hot air drying spray gun 12 are located directly above the roller 5 and can move back and forth in the plane parallel to the roller 5, and the distance of the second spray gun 10 and the hot air drying spray gun 12 from the roller 5 are adjustable, when the ring-shaped NdFeB magnet is supported by the retractable member 7, the roller 5 drives the ring-shaped NdFeB magnets to rotate, and the second spray gun 10 sprays the heavy rare earth slurry on the outer surface of the ring-shaped NdFeB magnet, the heavy rare earth slurry in the pressure stirring tub 1 is atomized by air pressure and then sprayed, a spray direction of the second spray gun 10 is parallel to a spray gun direction.

The slide rail 6 is provided at the lower part of the support frame 4. The slide rail 6 reciprocates up and down along the fixed support frame 4 through motor control. The slide rail 6 is provided with the support groove 9 for reciprocating along the slide rail 6. The support groove 9 is disposed in a V-shaped or corrugated shape or with protrusions on the surface, The support groove 9 is located directly under the roller 5, and the slide rail 6 drives the support groove 9 to move up and down to a state where the support groove 9 can hold or separate the ring-shaped NdFeB magnet. The support groove 9 can slide back and forth along the slide rail 6, and the support groove 9 is described with the V-shape in this embodiment.

The first spray gun 8 is provided at one end of the roller 5 away from the support frame 4. The first spray gun 8 and the central axis of the roller 5 are on the same straight line. The first spray gun 8 is used to spray the inner surface of the ring-shaped NdFeB magnet.

Control slide rail 6 moves upward along the fixed support frame 4 until the ring-shaped NdFeB magnets is in contact with the upper surface of the V-shaped support groove 9, and the retractable member 7 is adjusted to the contracted state. At this time, the supporting groove 9 provides support for the ring-shaped NdFeB magnets, and drives the ring-shaped NdFeB magnets to move to the first spray gun 8. When the ring-shaped NdFeB magnets pass through the first spray gun 8, the first spray gun 8 sprays the inner surface of the ring-shaped NdFeB magnet.

When using the device of the present application to increase the coercivity of the ring-shaped NdFeB magnet, follow the steps below:

a, the heavy rare earth powder R is mixed with an organic binder and an organic solvent to prepare the heavy rare earth slurry, and the prepared heavy rare earth slurry is placed in the pressure mixing barrel 1 for stirring. Heavy rare earth powder R refers to pure metal powder, compound powder or alloy powder of metal Tb or metal Dy; The organic adhesive is a resin adhesive or a rubber adhesive, and the organic solvent is a ketone, benzene or ester solvent.

b, installation of the ring-shaped NdFeB magnet: disposed the ring-shaped NdFeB magnet on the roller 5, adjust the retractable member 7 to be in the supporting state, prop up the ring-shaped NdFeB magnet, turn on the roller 5 to make the ring-shaped NdFeB magnets coaxial self-rotational movement with the roller 5;

c, production of the heavy rare earth coating on the outer surface of the ring-shaped NdFeB magnet: moving the second spray gun 10 and the hot-air drying spray gun 12 above the ring-shaped NdFeB magnets 11 to be sprayed, and adjust the distance between the second spray gun 10 and the ring-shaped NdFeB magnets, and then turn on the second spray gun 10 to spray the outer surface of the ring-shaped NdFeB magnets. After the spraying is completed, the second spray gun 10 is turn off and then turn on the hot air drying spray gun 12 to dry the ring-shaped NdFeB magnet with hot air, so that the heavy rare earth slurry sprayed on the outer surface of the ring-shaped NdFeB magnet is solidified, and finally the layer of heavy rare earth coating is formed on the outer surface of the ring-shaped NdFeB magnet;

d, production of heavy rare earth coating on the inner surface of the ring-shaped NdFeB magnet 11: after the drying is completed, turn off the roller 5 to stop the autobiography movement, and then the slide rail 6 is started to drive the V-shaped support groove 9 along the fixed support frame 4 to move upward to the V-shaped support groove 9 to fully support the ring-shaped NdFeB magnets 11, and make the retractable member 7 is in the contracted state, so that the ring-shaped NdFeB magnet is separated from the roller 5; turn on the control motor so that the V-shaped support groove 9 supports the ring-shaped NdFeB magnets to move toward the first spray gun 8, and at the same time the first spray gun 8 is turned on, so that the first spray gun 8 starts to spray heavy rare earth slurry around. After the ring-shaped NdFeB magnet passes through the first spray gun 8, the inner surface of the ring-shaped NdFeB magnet is sprayed with a layer of heavy rare earth slurry, after the spraying is completed, the ring-shaped NdFeB magnet is removed and placed in an oven for drying. The heavy rare earth slurry on the inner surface of the annular NdFeB magnet is solidified to form a heavy rare earth coating;

e, diffusion and aging treatment: The ring-shaped NdFeB magnets sprayed with heavy rare earth coatings will be diffused and aging treated under the protection of vacuum or inert gas to improve the coercivity of the NdFeB magnets.

In step c, the distance between the first spray gun and the surface of the ring-shaped NdFeB magnet to be sprayed is 10-100 mm, and the thickness of the heavy rare earth coating on the inner surface of the ring-shaped NdFeB magnet is greater than or equal to the thickness of the heavy rare earth layer on the outer surface.

In step e, the temperature of the diffusion treatment is 850° C.-950° C., the diffusion time is 4-72 h, the aging temperature of the aging treatment is 450-650° C., and the aging time is 3-15 h.

The specific operation of using the device of the present invention to increase the coercivity of the ring-shaped NdFeB magnet is shown in the following embodiments.

Example 1

Using pure Dy powder to mix with resin adhesive and benzene diluent to form heavy rare earth slurry, and put the heavy rare earth slurry into the pressure mixing barrel for stirring. Take the ring-shaped NdFeB magnet with an inner diameter of 5 mm, the wall thickness of 1 mm and the length of 5 mm, and disposed the ring-shaped NdFeB magnet on the roller, adjust the retractable member on the roller to make it in the supporting state and support up the ring-shaped NdFeB magnet, then turn on the roller to make the ring-shaped NdFeB magnet rotate with the roller, adjust the distance between the second spray gun and the surface of the ring-shaped NdFeB magnet to 10 mm, and then turn on the second spray gun to spray the heavy rare earth slurry on the outer surface of the ring-shaped NdFeB magnet, and the spraying thickness is controlled to 5 μm, turn on the hot air drying spray gun to dry the sprayed ring-shaped NdFeB magnet, and turn off the hot air drying spray gun after drying.

Turning off the rotation of the roller and make the retractable members on the roller in the contracted state, turn on the support mechanism, so that the ring-shaped NdFeB magnet is supported and fixed, and start to move along the axis of the roller to the first spray gun, turn on the first spray gun, make the first spray gun start spraying heavy rare earth slurry all around. When the ring-shaped NdFeB magnet passes through the first spray gun, a layer of heavy rare-earth slurry is sprayed on the inner surface of the ring-shaped NdFeB magnet, and the spray thickness is controlled at 8 μm. Then turn off the first spray gun, and put the sprayed ring-shaped NdFeB magnet in an oven for drying. After drying, the ring-shaped NdFeB magnet was diffused and aged at 900° C.*4 h+500° C.*3 h in a vacuum furnace. After that, the performance after diffusion was tested and compared with the performance before diffusion.

TABLE 1

| | Br(T) | Hcj(KA/m) | HK/Hcj |
|---|---|---|---|
| Magnet before diffusion | 1.44 | 1329 | 0.98 |
| Example 1 | 1.43 | 1679 | 0.96 |

Analyzing Table 1, it can be seen that after the Dy is diffused in the ring-shaped NdFeB magnet in Example 1, the remanence decreases by 0.01 T, the coercivity increases by 350 KA/m, and the square measurement value changes little.

Example 2

The operation process is similar to Example 1, but the composition of the heavy rare earth slurry and the specifications of the ring-shaped NdFeB magnet are different.

Using Tb hydride powder mixed with resin adhesive and ketone diluent to form heavy rare earth slurry, the inner diameter of the ring-shaped NdFeB magnet is 20 mm, the wall thickness is 10 mm, and the length is 100 mm.

Adjust the distance between the second spray gun and the surface of the ring-shaped NdFeB magnet to 50 mm. The outer surface spraying thickness of the ring-shaped NdFeB magnet is controlled to 50 μm, and the inner surface spraying thickness of the ring-shaped NdFeB magnet is controlled to 80 μm. The ring-shaped NdFeB magnet was diffused and aged at 850° C.*72 h+450° C.*15 h in a vacuum furnace. After that, the performance after diffusion was tested and compared with the performance before diffusion.

TABLE 2

| | Br(T) | Hcj(KA/m) | HK/Hcj |
|---|---|---|---|
| Magnet before diffusion | 1.38 | 1568 | 0.98 |
| Example | 1.35 | 2348 | 0.96 |

Analyzing Table 2, it can be seen that the remanence of the ring-shaped NdFeB magnet decreases by 0.03 T, and the coercivity increases by 780 KA/m, and the square measurement value changes little.

Example 3

The operation process is similar to Example 1, but the composition of the heavy rare earth slurry and the specifications of the ring-shaped NdFeB magnet are different. The heavy rare earth slurry is formed by mixing TbCu alloy powder with resin type adhesive and ester diluent.

The inner diameter of the ring-shaped NdFeB magnet is 30 mm, the wall thickness is 15 mm, and the length is 50 mm.

Adjust the distance between the second spray gun and the surface of the ring-shaped NdFeB magnet to 100 mm. The outer surface spraying thickness of the ring-shaped NdFeB magnet is controlled to 100 μm, and the inner surface spraying thickness of the ring-shaped NdFeB magnet is controlled to 130 μm. the ring-shaped NdFeB magnet was diffused and aged at 950° C.*30 h+650° C.*10 h in a vacuum furnace. After that, the performance after diffusion was tested and compared with the performance before diffusion.

TABLE 3

| | Br(T) | Hcj(KA/m) | HK/Hcj |
|---|---|---|---|
| Magnet before diffusion | 1.41 | 1210 | 0.98 |
| Example | 1.39 | 1934 | 0.96 |

Analyzing Table 3, it can be seen that the remanence of the ring-shaped NdFeB magnet decreases by 0.02 T, and the coercivity increases by 724 KA/m, and the square measurement value changes little.

It can be seen from the above embodiments that the device and method of the present invention can be used to spray a layer of heavy rare earth coating on the inner and outer surfaces of the ring-shaped NdFeB magnet, and after the diffusion treatment, the coercivity of NdFeB magnet can be significantly improved, and the remanence of the NdFeB magnet decreases very little.

What is claimed is:

1. A method for improving coercivity of ring-shaped NdFeB magnets, wherein the method comprises the following steps:

a. preparation of heavy rare earth slurry: mix heavy rare earth powder R, organic binder, and organic solvent to prepare heavy rare earth slurry; wherein the heavy rare earth powder R comprises pure Dy powder, pure Tb powder, Dy alloy powder, Tb alloy powder, Dy compound powder or Tb compound powder;

b. installation of the ring-shaped NdFeB magnets: the ring-shaped NdFeB magnets to be sprayed are installed on a rotating mechanisms that is able to control a simultaneous rotation of the ring-shaped NdFeB magnets, the rotating mechanism comprises a plurality of rollers and a plurality of retractable members, the plurality of rollers and the plurality of retractable members are disposed in a one-to-one corresponding manner, each of the plurality of retractable members is disposed on a side wall of a corresponding roller of the plurality of rollers and switches between a contracting state and a supporting state, some of the ring-shaped NdFeB magnets next to each other disposed on different roller are on a same plane, and a plurality of ring-shaped NdFeB magnets are sleeved on each of the plurality of retractable members, every two of the plurality of ring-shaped NdFeB magnets disposed on each of the plurality of rollers are disposed at intervals and parallel to each other;

c. production of heavy rare earth coating on outer surfaces of the ring-shaped NdFeB magnets:

a spray gun for spraying the outer surfaces of the ring-shaped NdFeB magnets is disposed on a side of the same plane where some of the ring-shaped NdFeB magnets next to each other disposed on different rollers are located, when each of the ring-shaped NdFeB magnets rotates around itself, the spray gun sprays the outer surfaces of the ring-shaped NdFeB magnets, after spraying, the ring-shaped NdFeB magnets are dried with air, so that the heavy rare earth slurry sprayed on the outer surfaces of the ring-shaped NdFeB magnets solidify to form a layer of the heavy rare earth coating on the outer surfaces of the ring-shaped NdFeB magnets;

d. production of heavy rare earth coating on inner surfaces of the ring-shaped NdFeB magnets;

a spray gun for spraying the inner surfaces of the ring-shaped NdFeB magnets is disposed in an axial direction of the ring-shaped NdFeB magnets, the ring-shaped NdFeB magnets are controlled to separate from the rotating mechanisms, and then the ring-shaped NdFeB magnets are controlled to move horizontally along a spray gun direction for spraying the inner surface of the ring-shaped NdFeB magnets, when the spray gun for spraying the inner surfaces of the ring-shaped NdFeB magnets passes through the ring-shaped NdFeB magnets in turn, the spray gun for spraying the inner surfaces of the ring-shaped NdFeB magnets is turned on to spray heavy rare earth slurry on the inner surfaces of the ring-shaped NdFeB magnets, remove the ring-shaped NdFeB magnets after spraying, and place the ring-shaped NdFeB magnets in an oven for drying, to solidify the heavy rare earth slurry on the inner surfaces of the ring-shaped NdFeB magnets to form a layer of the heavy rare earth coating on the inner surfaces of the ring-shaped NdFeB magnets;

e. diffusion and aging treatment:

the ring-shaped NdFeB magnets with heavy rare earth coatings sprayed on both the inner and outer surfaces are subjected to diffusion and aging treatment under a protection of vacuum or inert gas to increase coercivity of the ring-shaped NdFeB magnets.

2. The method according to claim 1, wherein in the step a: the organic binder is resin adhesive or rubber adhesive, the organic solvent is a ketone, a benzene or a ester solvent.

3. The method according to claim 1, wherein each of the plurality of retractable members (7) is adjusted to be in the supporting state so that the plurality of ring-shaped NdFeB magnets are supported on each of the plurality of retractable members (7).

4. The method according to claim 3, wherein adjust each of the plurality of retractable members (7) in step d to be in the contracting state, so that the plurality of ring-shaped NdFeB magnets break away from a support of each of the plurality of retractable members (7).

5. The method according to claim 1, wherein the spray gun for spraying the outer surfaces of the ring-shaped NdFeB magnets in step c is called a second spray gun, and there is a distance between the second spray gun and the outer surface of the ring-shaped NdFeB magnets to be sprayed.

6. The method according to claim 1, wherein, the spray gun for spraying the inner surfaces of the ring-shaped NdFeB magnets in step d is called a first spray gun (8), a support mechanism controls a movement of the ring-shaped NdFeB magnets to a position where the first spray gun (8) located, the support mechanism comprises a support frame (4), a sliding rail (6) that moves up and down along the support frame (4), a supporting groove (9) for supporting a plurality of ring-shaped NdFeB magnets, the supporting groove (9) is disposed on the sliding rail (6), when the plurality of ring-shaped NdFeB magnets is separated from the roller (5), the supporting groove (9) drives the plurality of ring-shaped NdFeB magnets to move along the sliding rail (6) to the first spray gun; a thickness of the heavy rare earth coating on the inner surface of the ring-shaped NdFeB magnets is greater than or equal to a thickness of the heavy rare earth layer on the outer surface.

7. The method according to claim 1, wherein a temperature of a diffusion treatment in step f is 850° C.-950° ° C., and a diffusion time is 4-72 h, an aging temperature of the aging treatment is 450-650° C., and an aging time is 3-15 h.

* * * * *